Sept. 2, 1947.  P. M. RIEDE  2,426,645
ROTARY PUMP
Filed July 9, 1942
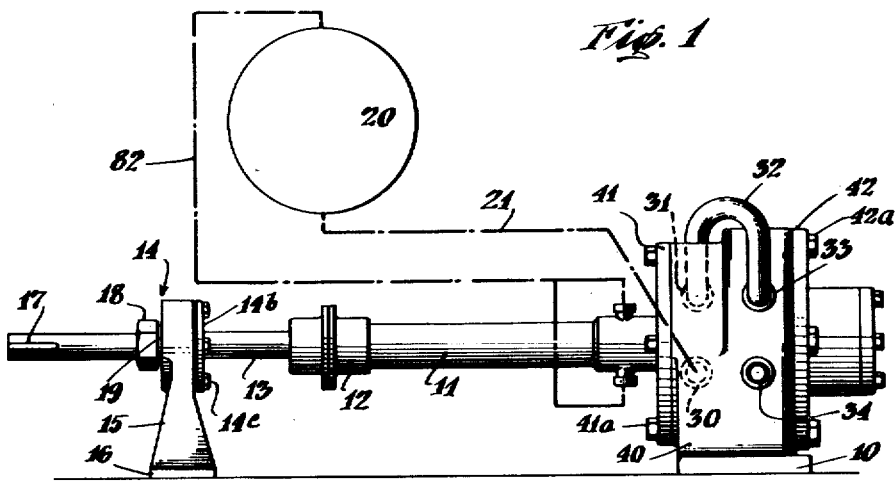
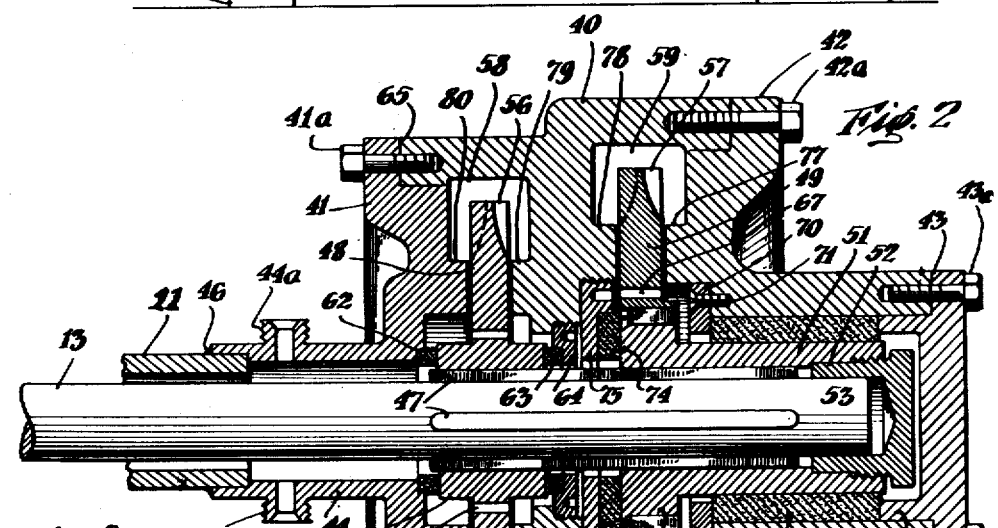
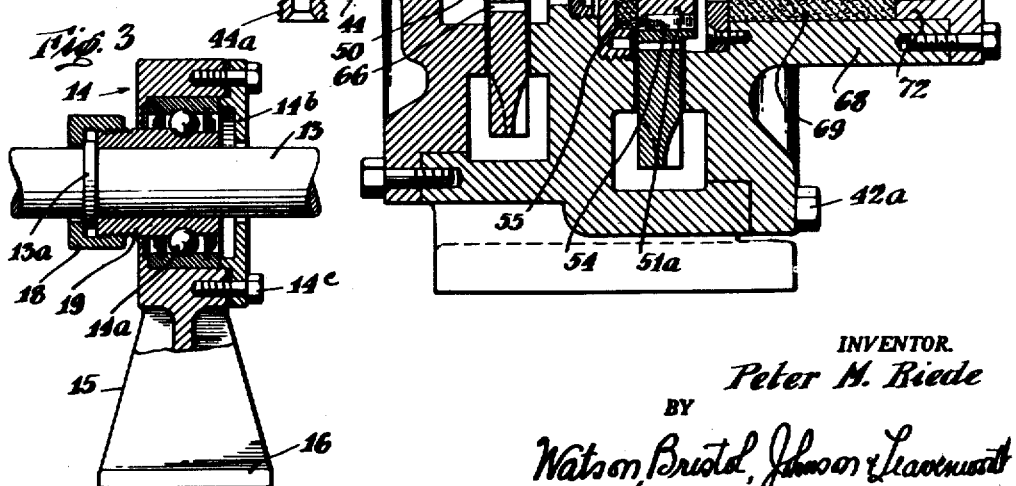
INVENTOR.
Peter M. Riede
BY
Watson, Bristol, Johnson & Leavenworth
ATTORNEYS Patented Sept. 2, 1947

2,426,645

UNITED STATES PATENT OFFICE 2,426,645

ROTARY PUMP

Peter M. Riede, Buffalo, N. Y., assignor to The Linde Air Products Company, New York, N. Y., a corporation of Ohio Application July 9, 1942, Serial No. 450,243

17 Claims. (Cl. 103—96)

The present invention relates to rotary pumps, particularly multi-stage pumps capable of delivering under pressure highly volatile fluids, such as liquid oxygen, which has a boiling point at atmospheric pressure considerably below 273° K.

The provision of a successful pump for such use presents unusual problems. The liquid itself is at a very low temperature, and for that reason different pump parts are subjected to considerable variation in temperatures. This occurs, e. g. where the pump remains idle for substantial periods of time allowing it to become warmed up and is then subjected to a sudden fall in temperature.

Because the liquid in question is so volatile it is important to avoid as far as possible the generation of heat through friction which may result in vaporization of the liquid, impairing the efficiency and causing the pump to become gas-bound in some cases. Low friction at the bearing surfaces requires good lubrication, which, however, at the low temperatures involved is a problem in itself. In this connection it is very desirable in handling some of the volatile liquids to avoid its becoming contaminated with lubricating compounds of the liquid hydrocarbon type, for example.

The volatile nature of such materials as liquid oxygen requires the avoidance of dissipation or conversion of energy into heat through turbulence and inefficient pressure stages in general. Gas pockets must be avoided. Elimination of leakage around bearings or shaft sealing means is important since the escape of the cold liquid may freeze the lubricating materials causing the pump to seize. Under ordinary circumstances leakage may be prevented by increasing the packing pressure, but increased packing pressures results in increased heat generation from friction.

The obtaining of higher pressures in rotary type pumps renders necessary the combination of two or more stages, and this introduces problems of leakage between stages as well as leakages at the bearings. Liquid in the higher stages may have considerable energy introduced therein by reason of the work done thereon and its temperature raised, and leakage thereof into a lower pressure stage results in vaporization and interference with the efficiency of the lower pressure pumping stage. It should be observed that many of the difficulties involved are conflicting; that is, devices or expedients which suggest themselves as a solution for one difficulty may enhance other difficulties.

The present invention is devoted to the provision of a pump which meets successfully the problems mentioned in part above. It embodies features of mounting the impellers and supporting and maintaining them in proper position, and of certain types of bearings and seals all associated in a manner to result in a pump capable of operating in a dependable, efficient manner to deliver a highly volatile liquid in substantial quantities and at relatively high pressures.

Other objects of the invention will in part be obvious and will in part appear hereinafter.

The invention accordingly comprises the features of construction, combination of elements, and arrangement of parts, which will be exemplified in the construction hereinafter set forth, and the scope of which invention will be indicated in the claims.

For a fuller understanding of the nature and objects of the invention reference should be had to the following detailed description taken in connection with the accompanying drawing, in which:

Fig. 1 is a general view showing the exterior of the rotary pump and its mounting and driving connections and certain fluid connections;

Fig. 2 is a cross-section of the pump showing the details of the inner parts; and Fig. 3 is a detailed view, in section, of the outboard bearing for the pump shaft.

Referring to Fig. 1, the pump is shown in general at 10 having a tubular sleeve extension 11 and an outer seal 12. The pump shaft 13 is provided with an outboard bearing 14 beyond the seal 12 and quite removed from the pump housing 10. The bearing 14 is mounted on a suitable bracket 15 extending upwardly from a supporting base 16. The pump shaft 13 is adapted to have a source of driving power connected to the outer end, a keyway 17 being shown for this purpose.

The bearing 14 is of a combined radial and thrust bearing type, a suitable one being shown in cross section in Fig. 3, comprising in general a ball bearing 14a held in the bracket 15 by a clamping ring 14b secured in place by cap screws 14c. A nut 18 is threaded over an extension of the inner sleeve 19 of the ball bearing, clamping the collar 13a on shaft 13 against the end of the sleeve, and holding the shaft against axial shifting.

A source of supply of liquid is shown diagrammatically as a container 20 having a line 21 connected to the pump housing.

The particular pump disclosed is a multi-stage pump having more precisely two stages. The line 21 from the container 20 connects at 30 with the inlet to the first stage. The discharge from the first stage is at 31 and is led therefrom through the external pipe 32 to the inlet 33 of the second stage, the discharge from the second stage being shown at 34.

Many of the detailed structural features of the pump may be varied to suit the circumstances, but the construction shown in Fig. 2 will be sufficient to illustrate the principles of the invention and the general relation of the parts. As there shown, the pump is of the two-stage type employing rotary elements of the bladed impeller type. The pump has a main casing 40 provided with an end cover plate 41 at the left secured in place by suitable means such as the cap screws 41a; and a similar end cover plate 42 at the right secured in place by cap screws 42a. The plate 42 has in turn a smaller plate 43, secured in place by cap screws 43a, sealing the inner end of the shaft 13 and its bearing means. The cover plate 41 is provided with an extending tubular portion 44, in which is secured the shaft sleeve 11 as by welding at 46. The shaft 13 has a splined portion 47 adapted to drive the low pressure stage impeller 48 and the high pressure stage impeller 49. The impeller 48 has an axially elongated hub portion 50 having keyways adapted to receive the shaft splines 47. Likewise the impeller 49 has an elongated hub sleeve portion 51 extending to the right provided with keyways adapted to receive the splines 47. The inner or right end of the sleeve 51 is provided with a combined closure and sleeve portion 52 threaded into the interior of the sleeve 51, the sleeve 52 having a bearing on the inner smooth end portion 53 of the shaft 13. The impeller 49 and the sleeve may be formed integral but for reasons to be more fully described, in the construction shown herein, in addition to the splined connection 47 between the drive shaft and sleeve 51, the impeller proper comprising the peripheral portion 49 has an axially slidable driving connection with the sleeve portion 51. This comprises keys 54 fitted in slots in the radially extending portion 51a of the sleeve 51, the slots being stopped short of the left face of the sleeve 51 by a shoulder 55 whereby the face of the sleeve is maintained unbroken and smooth. The central opening of the impeller part 49 is provided with suitable slots to fit over the keys 54.

The outer annular portions of the impeller 48 and 49 are provided with milled-out slots as shown at 56 and 57 respectively, there being similar alternate slots on each side of the impellers resulting in vanes adapted to propel the fluid throughout the respective channels 58 and 59 located in the pump housing as a whole. For the present purposes it may be assumed that the impeller vanes, and the pumping channels and their respective inlets and outlets follow a standard construction, and as indicated in Fig. 1 the channels 58 and 59 each extend for nearly the entire circumference of the pump housing, the inlet and outlet in each case being separated by a suitable partition. It may be noted, however, that the inlet, particularly to the first stage, should be of smooth contour without sharp turns, and gradually decreasing in size and shape from that of the inlet pipe to that of the pumping channel, the latter continuing uniform to its outlet.

The hub portion 50 of the impeller 48 is located between two bearing rings 62 and 63 which determine the axial position of the impeller 48, the hub having a slidable fit on the spline shaft whereby the impeller in effect floats on the supporting driving shaft. The bearing ring 62 is located in and supported by the housing cover plate 41, and the bearing ring 63 is carried by the ring 64 which is threaded into an annular recess in the main housing 40. The axial position of the impeller 48 may be adjusted through adjustment of the ring 64 and by the use of annular shims wherever appropriate, as adjoining one or both of the bearing rings 62 and 63 and also, if desired, at the point 65 between the main housing 40 and the cover plate 41. The impellers 48 and 49 have openings 66 and 67 respectively therethrough for balancing of fluid pressures in the opposite chambers.

Fitted within the tubular extending portion 68 of the end plate 42 is an elongated annular bearing sleeve 69 which serves as a radial support for the impeller sleeve 51 and in turn forms an inner radial bearing support for the drive shaft 13. The annular bearing sleeve 69 is secured against endwise movement at one end by the ring 70 suitably secured in the housing 40 as by means of the screws 71, and at the opposite end by the annular sleeve 72 formed on the small end plate 43.

The sleeve 51 bears at the left against an annular thrust bearing ring 74 located in a supporting ring 75 threaded into an annular recess in the main housing 40. In operation fluid pressure leaking through to the right-hand side of the sleeve 51 from the pumping channel 59 serves to urge the sleeve to the left against the thrust bearing 74. This has the result of maintaining a seal against leakage of fluid from the high pressure stage into the low pressure stage. The bladed impeller part 49 is subjected to equal pressures on its opposite sides and maintains itself centered with respect to its channel since it is free to move axially on its driving connection and there is little or no rubbing to create friction and heat. As shown, the driving connection is through the intermediate sleeve 51, although the impeller and its channel could be moved over and the impeller driven direct from the shaft 13 or through some other intermediate part, but the present arrangement is advantageous from the standpoint of simplicity and compactness. An important feature is the provision of a sealing ring means between the enclosed high pressure stage and the lower stage, the ring being automatically urged into sealing position by an impositive means comprising fluid pressure as above described. It is to be noted that as wear occurs between the sleeve 51 and the thrust bearing 74, the sleeve 51 is free to move to the left but because of the slidable connection with the impeller part 49 the latter is not required to move therewith. If an initial axial adjustment of the thrust bearing 74, or an adjustment thereof for wear, is desirable, this may readily be effected by adjustment of the ring 75 or by the use of shims on either side of the thrust bearing 74.

As shown in the drawings, the pumping channel 59 is defined at its inner part by the wide ribs 77 and 78 projecting toward the impeller on opposite sides from the end plate 42 and housing 40 respectively. The parts are proportioned such that these ribs are fairly close to the impeller but have no frictional engagement therewith, a clearance of a few thousandths of an inch being provided on each side. Similarly, the pumping channel 58 for the low pressure stage is defined on one side by a rib 79 projecting from the main housing toward the impeller 48 and a similar rib 80 projecting from the cover plate 41 toward the impeller 48 on the opposite side. A small clearance is provided between the ribs 79 and 80 and the impeller 48, just as in the case of the impeller 49.

The inner end of the shaft and all of the bearings within the pump housing are completely enclosed and sealed within the housing, resulting in a pump casing free of leakages. This is made possible particularly by the use of bearing members, in this case the thrust bearings 62, 63 and 74, and radial bearing 69, of a character which are self-lubricating, not requiring the application of any lubricant, such as hydrocarbons, from the outside. These bearings are made of a material which is also inert to most liquids, in particular liquid oxygen. A bonded graphite, which may be impregnated if desired with suitable materials, has been found especially effective for the purpose described. Such bearings are not only self-lubricating and inert to liquid oxygen as noted, but are in addition capable of functioning as a fairly tight seal against leakages.

It will be seen, therefore, that all thrust is taken by bearings which are self-lubricating in character, and that the impellers, being slidable with respect to their respective drives, are relatively independent of contraction and expansion of parts of the pump due to changes in temperature which occur particularly in the pumping of highly volatile liquids maintained at extremely low temperatures. It is particularly noted that the impellers are independent of any distortion or movement of the drive shaft resulting either from changes in temperature or from deflections caused by pumping pressures or driving connections. Attention is directed to the fact that the drive shaft is provided with a relatively long tubular extension 11 and receives its outer support in an outboard bearing 14, the driving connection being beyond the bearing.

An outer seal for the shaft 13 within the tube 11 is shown at 12, the specific construction of which may vary and the details are not described herein, but in general it may comprise a bellows type seal in which a pair of annular bearing rings, one of which is rotatable, are urged together in the axial direction, and one ring being of a material similar to the thrust bearing rings located on the interior of the pump housing. A pocket of gas will exist in the shaft sleeve 11 adjacent the seal which will act to some extent as an insulator, and that together with the length of sleeve 11 will tend to maintain the seal at a suitable temperature for low friction while minimizing the heat leakage into the pump. In addition, however, the arrangement may include preferably a bleed-off from the shaft housing extension 44 connected to the nipples 44a thereof. The bleed is taken to some closed part of the system to relatively low pressure, such as to the top of the main supply container 20 as shown by the line 82 in Fig. 1 having branches leading to each of nipples 44a. With the arrangement in general shown having the outer bearing at a point remote from the pump housing and a seal in between, the outer bearing 14 which receives the main side thrusts from the driving forces, may be lubricated in any manner desired and maintained at a temperature suitable for normal lubricants; and, on the other hand, the heat leakages to the pump housing are reduced to a minimum.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A pump comprising a casing, a drive shaft rotatably mounted therein, an impeller mounted in said casing on said shaft and provided with a slidable driving engagement therewith, and self-lubricating thrust bearing means of a solid composition which is self-lubricating independently of any extraneous lubricant located in said casing at opposite sides of said impeller to determine its axial position independently of variations in the axial position of said shaft.

2. A pump comprising a casing, a drive shaft rotatably mounted therein, an impeller in said casing mounted on said shaft and having an axially freely slidable drive connection therewith, an annular thrust bearing in said casing having a surface engageable by an annular bearing member rotatable with said impeller, and means for applying fluid pressure to said member during pump delivery to cause said bearing surfaces to be in engagement and effecting thereby a fluid sealing means.

3. A pump comprising a casing, a drive shaft rotatably mounted therein, an impeller in said casing mounted on said shaft, a thrust bearing in said casing having an annular surface extending around said shaft, a bearing member rotatable with said impeller and having a bearing surface adapted to engage said first mentioned surface, one of said surfaces comprising self-lubricating material, and means for utilizing fluid pressure derived from the operation of said impeller to maintain said surfaces in engagement and effect thereby a fluid seal.

4. A pump comprising a casing, a drive shaft rotatably mounted therein, an impeller mounted on said shaft and rotative in a pumping channel in said casing, an annular thrust bearing in said casing having a surface axially engageable by a surface rotatable within said impeller, means for applying fluid pressure derived from the operation of said impeller to maintain said surfaces in engagement forming thereby a combined thrust bearing means and seal against axial leakage of fluid, and means for axially adjusting the position of said annular thrust bearing.

5. In a multiple stage pump, a housing, a first impeller rotatable in a pumping channel comprising one stage, a second impeller rotatable in its channel comprising a higher pressure stage, partition means between said stages, impeller drive shaft means extending through an opening in said partition means, fluid sealing means extending around said shaft associated with said partition means, and impositive pressure means for urging said sealing means into firm engagement during pump operation.

6. In a multiple stage pump, a housing, a first impeller rotatable in a pumping channel comprising one stage, a second impeller rotatable in its channel comprising a higher pressure stage, partition means between said stages, impeller drive shaft means extending through an opening in said partition means, thrust bearing means for said higher pressure stage extending around said shaft and associated with said partition means including a thrust bearing surface rotatable with said higher pressure impeller, and means for applying fluid pressure derived from the said higher pressure stage to urge said thrust bearing means into engagement whereby said thrust bearing means effects an axial fluid seal between the two stages.

7. In a multi-stage rotary pump, a housing, a rotatable drive shaft mounted in said housing with an inner end completely enclosed therein and the other end extending outwardly for a driving connection, a first stage impeller and a higher pressure stage impeller each rotatable in its respective pumping channel in said housing with partition means between said channels, said higher pressure stage impeller being mounted inwardly from the first stage adjacent said inner end of the shaft, fluid sealing means for said high pressure stage impeller associated with said partition means closely adjacent and extending around said shaft adapted to be urged axially into engagement, and means for applying pressure thereon to cause such engagement and effect an axial fluid seal between said impellers.

8. A pump comprising a casing, an impeller rotatable therein, a drive shaft rotatably mounted in said casing having a part extending exteriorly thereof and having a slidable driving engagement with said impeller whereby they are free to move axially relative to each other, radial bearing means for the inner end of said shaft in said casing, thrust bearing means for said impeller within said casing adapted to determine its axial position independently of the axial position of said shaft, said radial and thrust bearing means being of a solid self-lubricating type and being completely enclosed together with the inner shaft end within said casing including a seal for the exteriorly extending shaft part, and an outboard bearing for said shaft extension separated from said casing and seal constructed to determine the axial position of said shaft.

9. A pump comprising a casing, an impeller rotatable therein, a drive shaft rotatably mounted in said casing having a part extending exteriorly thereof and having a slidable driving engagement with said impeller whereby they are free to move axially relative to each other, radial bearing means for the inner end of said shaft in said casing, thrust bearing means for said impeller within said casing adapted to determine its axial position independently of the axial position of said shaft, said radial and thrust bearing means being of a solid self-lubricating character and being completely enclosed together with the inner shaft end within said casing.

10. In a rotary pump having a casing, a rotary drive shaft, a sleeve thereon having a freely slidable driving connection with said shaft, an impeller mounted on said sleeve and having a freely slidably driving connection with said sleeve, said impeller being rotatable in a channel in said casing, and said casing being provided with an annular bearing surface engageable by said sleeve, and means for applying fluid pressure derived from said pumping channel during operation to urge said sleeve into engagement with said surface to form a fluid seal for said shaft.

11. In a multi-stage pump a housing, a first impeller rotatable in a channel therein comprising a first stage, a second impeller rotatable in another channel comprising a higher pressure stage, partition means between said stages, a drive shaft with an inner end rotatably mounted in said casing having a slidable driving engagement with each of said impellers whereby the shaft and impellers are each adapted to move axially relatively to the other, said shaft having a part extending exteriorly of the casing from the side at which said first pump stage is located, radial bearing means in said casing for said shaft, thrust bearing means located at opposite sides of said first impeller to determine its axial position independently of the drive shaft, rotary sealing means associated with said partition around said shaft, means for applying fluid pressure derived from the higher pressure stage to urge said sealing means into engagement to effect an axial fluid seal between the two stages, said sealing means and each of said radial and thrust bearing means having a contacting part of solid self-lubricating material, and said bearings together with the inner shaft end being completely enclosed within said casing including a seal for the exteriorly extending shaft part, and an outboard bearing for said shaft extension separated from said casing and shaft seal.

12. A pump comprising a casing, a drive shaft rotatably mounted therein, an impeller in said casing having a hub part mounted on said shaft provided with an axially freely slidable drive connection thereto, an annular thrust bearing in said casing having a surface axially engageable by a bearing surface associated and rotatable with said hub part, and means for applying fluid pressure derived from the operation of said impeller to urge said hub part toward said casing thrust bearing and maintain said surfaces in engagement forming thereby a combined thrust bearing means and seal against axial leakage of fluid.

13. A pump comprising a casing, a drive shaft rotatably mounted therein, an impeller operative in a pumping channel in said casing and having a hub part provided with an axially freely slidable driving connection with said shaft, a casing part having an opening through which said shaft extends and provided with an annular thrust surface extending around said shaft, a complemental thrust bearing surface rotatable with said hub part adapted to engage said first mentioned surface, one of said surfaces being formed of a solid self-lubricating material, and means for utilizing fluid pressure derived from the operation of said pump to urge said surfaces into engagement while the pump is in operation and effect thereby a fluid seal.

14. In a rotary pump having a casing, a rotary drive shaft mounted therein, an impeller rotatable in a channel in said casing, a hub part for said impeller on said shaft, said impeller having a freely slidable driving connection with said hub part, said casing being provided with an annular thrust bearing surface axially engageable by a complemental thrust bearing surface rotatable with said hub part, and means for applying impositive pressure to said hub part for urging surfaces into engagement to form a fluid seal, the axial position of said impeller being independently determined by the pumping channel surfaces.

15. In a rotary pump, a casing, a plurality of rotary impellers therein of the turbine type with pumping blades at the periphery thereof, an annular pumping channel for the bladed peripheral portion of each of said impellers, a rotary drive shaft mounted in said casing, each of said impellers having an axially freely slidable drive connection with said shaft independently of the other, and means for each of said impellers located inwardly toward the axis from the bladed portion of the respective impellers for determining the axial position of each of said impellers independently of the other and of the shaft.

16. In a rotary pump, a casing, an impeller rotatable therein, a drive shaft rotatably mounted in said casing having an end extending exteriorly thereof and having a slidable driving engagement with said impeller whereby one is free to move axially with respect to the other, thrust bearing means in said casing engageable by a hub portion of said impeller to determine its axial position, a radial bearing for said shaft located inwardly of said impeller, said casing being of a character completely to enclose the inner end of said shaft, and an outboard bearing for said shaft extension separated from said casing constructed to determine the axial position of said shaft.

17. In a rotary pump, a casing, an impeller rotatable therein, a drive shaft rotatably mounted in said casing having an end extending exteriorly thereof and having a slidable driving engagement with said impeller whereby one is free to move axially with respect to the other, thrust bearing means in said casing engageable by a hub portion of said impeller to determine its axial position, a radial bearing for said shaft located inwardly of said impeller, said casing being of a character completely to enclose the inner end of said shaft and said bearings being of a solid self-lubricating material, and an outboard bearing for said shaft extension separated from said casing constructed to determine the axial position of said shaft.

PETER M. RIEDE.

REFERENCES CITED

The following references are of record in the file of this patent:

UNITED STATES PATENTS

| Number | Name | Date |
|---|---|---|
| 2,258,416 | Leopold et al. | Oct. 7, 1941 |
| 2,296,640 | Hansen | Sept. 22, 1942 |
| 2,150,078 | Pollock | Mar. 7, 1939 |
| 1,563,129 | Weil | Nov. 24, 1925 |
| 1,583,378 | Denison | May 18, 1926 |
| 1,595,536 | Walters | Aug. 10, 1926 |
| 390,332 | Andrews | Oct. 2, 1888 |
| 1,667,992 | Sherwood et al. | May 1, 1928 |
| 2,056,553 | Abramson | Oct. 6, 1936 |
| 1,340,472 | Woock et al. | May 18, 1920 |
| 1,566,340 | Myers | Dec. 22, 1925 |

Certificate of Correction

Patent No. 2,426,645.

September 2, 1947.

PETER M. RIEDE

It is hereby certified that error appears in the printed specification of the above numbered patent requiring correction as follows: Column 6, line 53, claim 4, for the word "within" read *with*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.* nection with said shaft independently of the other, and means for each of said impellers located inwardly toward the axis from the bladed portion of the respective impellers for determining the axial position of each of said impellers independently of the other and of the shaft.

16. In a rotary pump, a casing, an impeller rotatable therein, a drive shaft rotatably mounted in said casing having an end extending exteriorly thereof and having a slidable driving engagement with said impeller whereby one is free to move axially with respect to the other, thrust bearing means in said casing engageable by a hub portion of said impeller to determine its axial position, a radial bearing for said shaft located inwardly of said impeller, said casing being of a character completely to enclose the inner end of said shaft, and an outboard bearing for said shaft extension separated from said casing constructed to determine the axial position of said shaft.

17. In a rotary pump, a casing, an impeller rotatable therein, a drive shaft rotatably mounted in said casing having an end extending exteriorly thereof and having a slidable driving engagement with said impeller whereby one is free to move axially with respect to the other, thrust bearing means in said casing engageable by a hub portion of said impeller to determine its axial position, a radial bearing for said shaft located inwardly of said impeller, said casing being of a character completely to enclose the inner end of said shaft and said bearings being of a solid self-lubricating material, and an outboard bearing for said shaft extension separated from said casing constructed to determine the axial position of said shaft.

PETER M. RIEDE.

REFERENCES CITED

The following references are of record in the file of this patent:

UNITED STATES PATENTS

| Number | Name | Date |
| --- | --- | --- |
| 2,258,416 | Leopold et al. | Oct. 7, 1941 |
| 2,296,640 | Hansen | Sept. 22, 1942 |
| 2,150,078 | Pollock | Mar. 7, 1939 |
| 1,563,129 | Weil | Nov. 24, 1925 |
| 1,583,378 | Denison | May 18, 1926 |
| 1,595,536 | Walters | Aug. 10, 1926 |
| 390,332 | Andrews | Oct. 2, 1888 |
| 1,667,992 | Sherwood et al. | May 1, 1928 |
| 2,056,553 | Abramson | Oct. 6, 1936 |
| 1,340,472 | Woock et al. | May 18, 1920 |
| 1,566,340 | Myers | Dec. 22, 1925 |

---

Certificate of Correction

Patent No. 2,426,645.

September 2, 1947.

PETER M. RIEDE

It is hereby certified that error appears in the printed specification of the above numbered patent requiring correction as follows: Column 6, line 53, claim 4, for the word "within" read *with*; and that the said Letters Patent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*